United States Patent
Brison et al.

[11] Patent Number: 6,005,985
[45] Date of Patent: Dec. 21, 1999

[54] POST-PROCESSING SYSTEM FOR OPTICAL CORRELATORS

[75] Inventors: William Woods Brison, Littleton; Roger Allen Green, Morrison, both of Colo.

[73] Assignee: Lockheed Martin Corporation, Bethesda, Md.

[21] Appl. No.: 08/901,935

[22] Filed: Jul. 29, 1997

[51] Int. Cl.[6] .......................... G06K 15/316
[52] U.S. Cl. .......................... 382/278; 382/279
[58] Field of Search .......................... 382/276, 278, 382/279, 309; 364/819, 820, 821, 822, 824

[56] References Cited

U.S. PATENT DOCUMENTS

| | | | |
|---|---|---|---|
| 4,347,580 | 8/1982 | Bond | 364/824 |
| 4,637,056 | 1/1987 | Sherman et al. | 382/31 |
| 4,651,341 | 3/1987 | Nakashima et al. | 382/278 |
| 4,720,871 | 1/1988 | Chambers | 382/278 |
| 4,735,486 | 4/1988 | Leib | 350/162.13 |
| 4,832,447 | 5/1989 | Javidi | 350/162.13 |
| 4,837,843 | 6/1989 | Owechko | 382/31 |
| 4,864,629 | 9/1989 | Deering | 382/278 |
| 4,869,574 | 9/1989 | Hartman | 350/162.13 |
| 5,050,220 | 9/1991 | Marsh et al. | 382/4 |
| 5,086,483 | 2/1992 | Capps | 382/31 |
| 5,101,270 | 3/1992 | Boone et al. | 382/278 |
| 5,175,775 | 12/1992 | Iwaki et al. | 382/31 |
| 5,175,802 | 12/1992 | Crookshanks | 382/278 |
| 5,220,622 | 6/1993 | Scarr | 382/31 |
| 5,239,595 | 8/1993 | Takemura et al. | 382/31 |
| 5,257,322 | 10/1993 | Matsuoka et al. | 382/31 |
| 5,323,472 | 6/1994 | Falk | 382/31 |
| 5,363,455 | 11/1994 | Nishii et al. | 382/31 |
| 5,418,380 | 5/1995 | Simon et al. | 250/550 |
| 5,485,312 | 1/1996 | Horner et al. | 359/561 |
| 5,495,428 | 2/1996 | Schwartz | 382/274 |
| 5,550,937 | 8/1996 | Bell et al. | 382/278 |

*Primary Examiner*—Amelia Au
*Assistant Examiner*—Jingge Wu
*Attorney, Agent, or Firm*—Dorr, Carson, Sloan & Birney, P.C.

[57] ABSTRACT

A post-processing system for an optical correlator automatically detects and ranks peaks in the correlation image. An array of input buffers each receive pixels from a predetermined region of the image from the correlator camera. An array of peak detectors search the image pixels in each region for correlation peaks exceeding a predetermined threshold figure of merit. For example, each peak detector can be convolver array and a local maximum detector. The peak detectors generate a report entry for each such correlation peak that contains the figure of merit and location of the peak within the image. Results sorting and reporting means collect and store the report entries from each peak detector. The report entries are sorted by their figures of merit and reported to the host computer system.

20 Claims, 5 Drawing Sheets

POST-PROCESSING SYSTEM FOR OPTICAL CORRELATORS

BACKGROUND OF THE INVENTION

FIELD OF THE INVENTION

The present invention relates generally to the field of optical correlators. More specifically, the present invention discloses a post-processing system for locating, ranking, and reporting correlation peaks in the correlation plane image of an optical correlator.

STATEMENT OF THE PROBLEM

An optical correlator system performs the correlation of an input scene with a corresponding filter image of any object or feature of interest that might be contained within the input scene. The resulting correlation plane image is then captured by a high-speed detector (typically CCD) and analyzed for the presence of a correlation peak. For simple pattern recognition applications, a correlation peak will be produced that can easily be distinguished from noise by using simple intensity thresholding techniques. However, the correlation of more complex images, and thus the more typical application for an optical correlator, tends to produce less distinguishable correlation peaks. For most optical correlator applications it becomes necessary to discriminate correlation peaks in the presence of cross-correlation clutter and system noise that in many cases can equal or even exceed the intensity of the true correlation peaks.

The analysis of correlation plane images for correlation peaks, herein referred to as post-processing, must be done at speeds sufficient to sustain the real-time throughput capabilities of an optical correlator system, which to date is on the order of one thousand frames per second. This magnitude of throughput makes it prohibitive to perform the more complex image processing functions required for adequate correlation peak enhancement and detection using conventional general purpose processors and software based processing algorithms.

A wide variety of optical correlators have been used in the past, including the following:

| Inventor | US Pat. No. | Issue Date |
| --- | --- | --- |
| Horner et al. | 5,485,312 | Jan. 16, 1996 |
| Simon et al. | 5,418,380 | May 23, 1995 |
| Nishii et al. | 5,363,455 | Nov. 8, 1994 |
| Falk | 5,323,472 | June 21, 1994 |
| Matsuoka et al. | 5,257,322 | Oct. 26, 1993 |
| Takemura et al. | 5,239,595 | Aug. 24, 1993 |
| Scarr | 5,220,622 | June 15, 1993 |
| Iwaki et al. | 5,175,775 | Dec. 29, 1992 |
| Capps | 5,086,483 | Feb. 4, 1992 |
| Marsh et al. | 5,050,220 | Sep. 17, 1991 |
| Hartman | 4,869,574 | Sep. 26, 1989 |
| Owechko | 4,837,843 | June 6, 1989 |
| Javidi | 4,832,447 | May 23, 1989 |
| Leib | 4,735,486 | April 5, 1988 |
| Sherman et al. | 4,637,056 | Jan. 13, 1987 |

Simon et al., Takemura et al., Hartman, Leib, Matsuoka et al., and Nishii et al. disclose general examples of optical correlators, but provide little detail about how correlation peaks are to be detected or used.

Marsh et al, Horner et al., Owechko, and Javidi disclose examples of optical correlators with threshold logic for determining whether the correlation image contains a peak exceeding a limit.

Falk discloses an optical correlator with opto-electronic feedback. The optical correlator plane feeds back information through a processor to a second modulator which varies a parameter in the reference image.

Sherman et al. disclose an optical correlator using electronic image preprocessing. Analyzer circuitry 138, 140 with an optical detector 136 at the correlation plane analyzes the shape of the resulting correlation function to determine the intensity and shape of its peak.

Capps discloses an optical correlator that produces an output image that is incident onto a two-dimensional array of electronic processing cells. Each processing cell includes a photodetector that produces a local detection signal, as well as a means for communicating detection signals with adjacent cells. Each processing cell produces an output signal if the local detection signal and neighboring detection signals satisfy predetermined criteria.

Iwaki et al. disclose an optical correlator in which multiple images are combined in a single reference image and thereby processed simultaneously for each object image. A correlator coefficient calculating unit 8 processes the resulting correlation signal to determine the two-dimensional correlation coefficients for each of the images in the reference set.

Scarr discloses an optical correlator used for searching for occurrences of an item in a memory. The complexity of detector in the output plane of the correlator is reduced by moving the item to be sought step-wise across the input plane of the correlator. The detector comprises a single column of photodetectors, each of which detect a peak correlation signal within a predetermined range.

SOLUTION TO THE PROBLEM

None of the prior references show a dedicated hardware implemented post-processing module that is capable of performing the post-processing algorithms of the present design and at the processing speeds required by optical correlators. The present design is compact and of sufficiently low power consumption to allow easy integration directly into optical correlators.

SUMMARY OF THE INVENTION

This invention provides a post-processing system for an optical correlator that automatically detects and ranks peaks in the correlation image. Post-processing of optical correlator detector images requires high-speed algorithms implemented in electronic hardware to sustain the real-time throughput capability necessary to support the achievable frame rates of optical correlator systems. This post-processing approach includes several pipelined functions for the real-time readout, analysis, and results reporting of optical correlator detector plane imagery. First, the synchronized readout and temporary data buffering of the digital image data from high-speed multi-tap sensor arrays is performed. Second, the real-time pixel level calibration of the sensor output data for offset and gain adjustments of sensor and/or correlator related inconsistencies is performed. Next, a shape-based correlation peak enhancement algorithm is performed to enhance overall correlator signal-to-noise performance and suppress cross-correlation noise from the optical processor. Finally, each correlation output image is scanned for qualifying peaks and their associated X,Y coordinates and the responsible correlator input and filter image ID values are latched and sorted in descending order of merit. All of these functional steps are designed to allow for maximum programmability to support the easy adaptation of the post-processor to any optical correlator and to allow for the optimization of algorithm parameters to best support correlator specific performance requirements.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
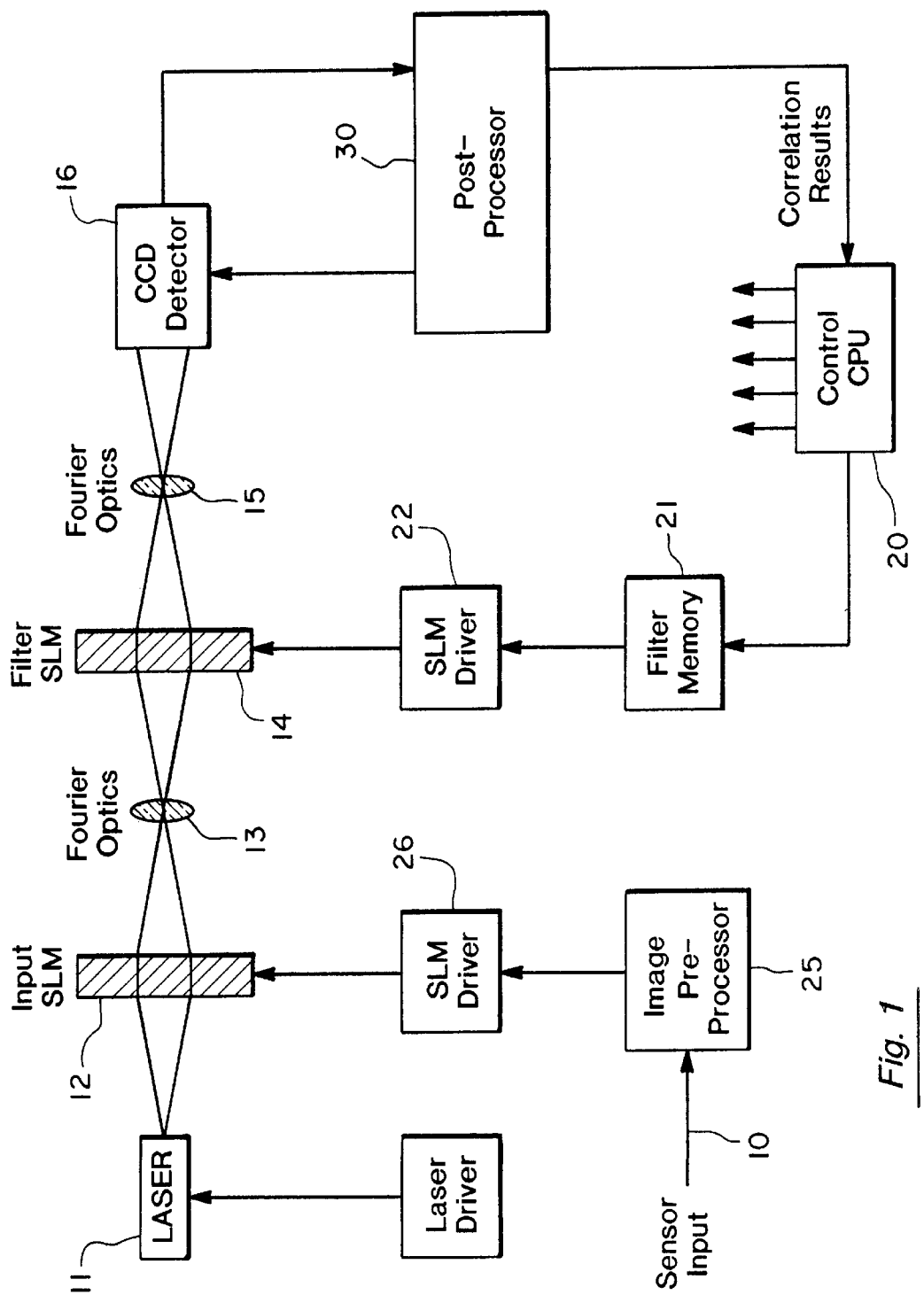
FIG. 1 is a block diagram of an optical correlator including the post-processor system.
Figure 3:
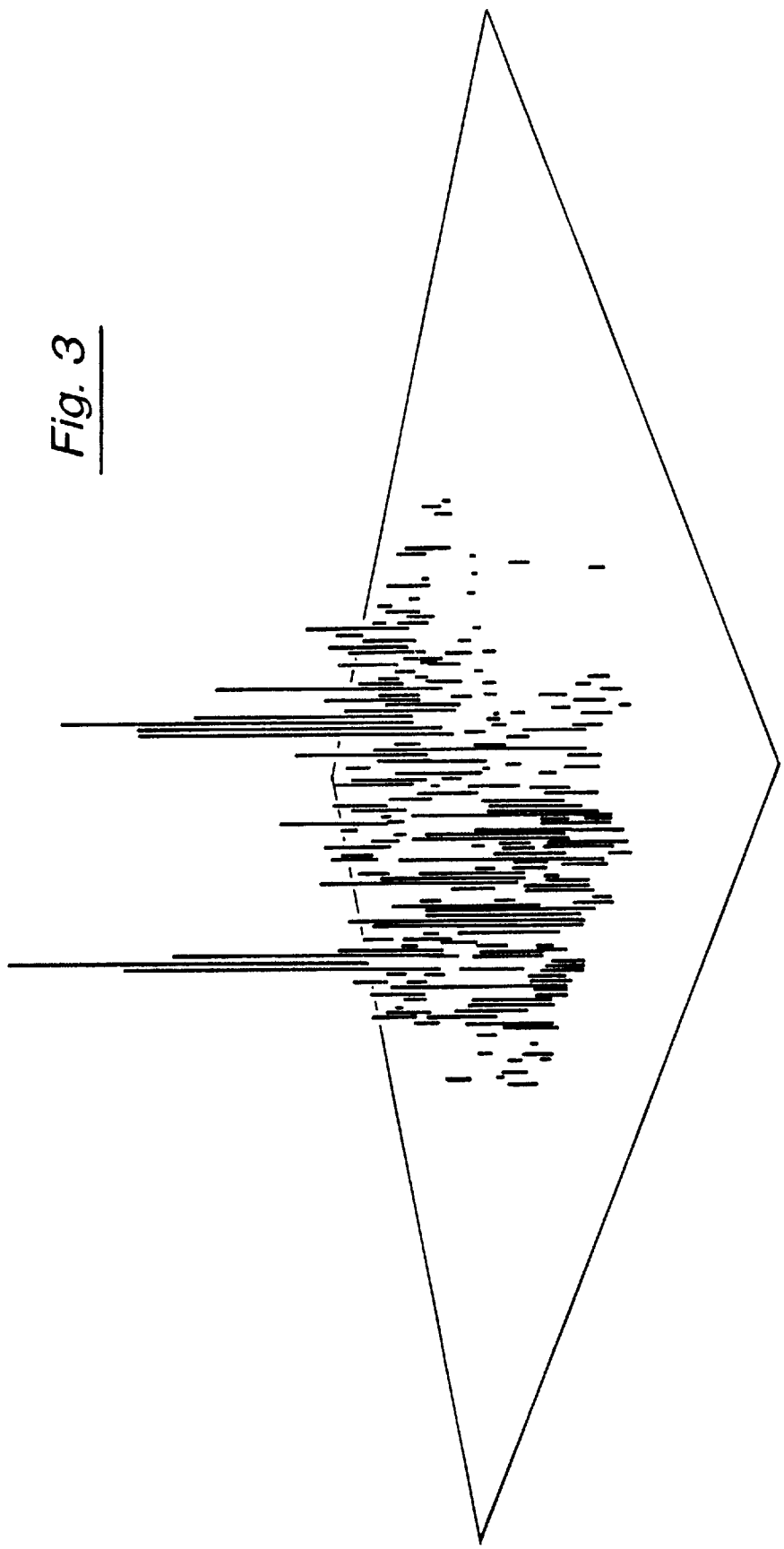
FIG. 3 is a three-dimensional graph illustrating the intensity peaks in a correlator image.

FIG. 1 shows the overall architecture of an optical correlator system and the post-processing functions described herein. The system shown is that of a Vander Lugt correlator system. Image data 10 is provided to the system from any external source and submitted to an image preprocessor 25 for conversion of the image data to a form that is compatible with the spatial light modulators (SLMs) 12 and 14 being used in the system. The input image is then written to the input SLM 12 by the input SLM driver 26. Simultaneously, a pre-generated Fourier filter of the particular object or feature being sought within the input image is written to the filter SLM 14 by the filter SLM driver 22 from the filter memory 21. By passing a collimated laser beam 11 through the system, the input image is phase modulated on the laser beam by the input SLM 12. The beam is then transformed by a set of Fourier optics 13 and re-modulated by the filter SLM 14 to achieve the image correlation. A second set of Fourier optics 15 transforms the results back to a spatial domain image and the CCD detector 16 captures the image of any resulting correlation peaks from the process. FIG. 3 is a three-dimensional graph illustrating the intensity peaks in a correlator image. Although the post-processor 30 uses only a two-dimensional image from the CCD detector 16, the three-dimensional representation in FIG. 3 more vividly illustrates the possible complexity of a typical correlator image. The intensity of a gray-scale image is shown here by the vertical Z-axis dimension. This particular correlator image has two distinct objects of interest that produce the two large correlation peaks near the center of the image. However, there is considerable noise surrounding both peaks, including some lower intensity shapes that look similar in nature to the larger correlation peaks. In some cases, it is possible to have correlation peaks that are actually of a lesser intensity than some wider areas within the image.

Figure 4:
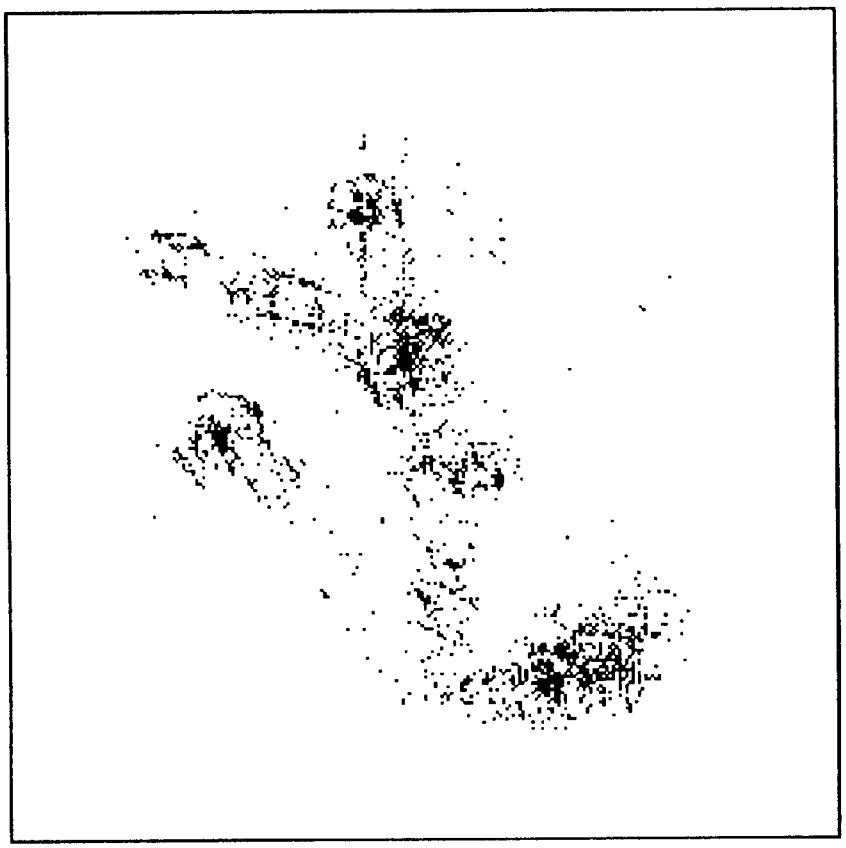
FIG. 4 is a two-dimensional example of a correlator image corresponding to FIG. 3. Black and white have been reversed in the interest of clarity.

FIG. 4 is a two-dimensional example of a correlator image corresponding to FIG. 3. Black and white have been reversed in the interest of clarity, so that correlation peaks appear as black dots. At this point the post-processor 30 analyzes the detector image for the presence of correlation peaks, collects the correlation statistics, and reports the results to system's host processor 20.

This optical correlation process can be repeated at very high frame rates, only limited by the achievable combined speed of the SLMs 12, 14 and the detector 16 being used. A wide selection of components is possible for both SLMs and detectors, both in terms of pixel resolution, binary versus gray-scale (analog) operation, and their speed of operation, depending on the desired performance for the correlator. The detector output is functionally the same however for any optical correlator system and the need for high speed post-processing capabilities of this invention remain.

Post-Processor Architecture. Turning to the simplified block diagram of the post-processor 30 depicted in FIG. 2, the detector synchronization and readout control logic 32 triggers the CCD detector 16 to transmit its data. This transfer of detector image data is orchestrated to be synchronous to the correlator's operation in terms of laser modulation, SLM operation and to allow sufficient time for detector CCD integration of the detector plane images. In the embodiment of the present invention depicted in FIG. 2, the CCD detector 16 transfers its images via four parallel data taps. Each tap contains pixel data from a corresponding quadrant of the CCD detector's output image. The post-processor 30 thus provides four corresponding parallel input taps to receive the data. However, it should be expressly understood that any number of input taps and input buffers could be used.

The detector synchronization and readout control logic 32 operates under control of the host computer system 31 (or automatically if in hardware-triggered mode) to signal the CCD detector 16 to initiate the image transfer. In response to this trigger, the CCD detector 16 sends serialized pixel data back. For example, the detector camera 16 can be an EG&G Reticon model no. MD4256-C high sensitivity, high speed, 256×256 pixel CCD camera module. It sends data at a rate of 20 million pixels per second on each of the four taps with a maximum frame rate of 1070 frames per second. The synchronization and control logic 32 can be implemented in field-programmable gate array (FPGA) logic, which offers easy adaptation of transfer protocols and frame rates for the accommodation of other detector CCDs.

The digital camera data arriving on each tap is first put through a process of offset and gain adjustment 33 to compensate for any optical system noise and camera transfer function anomalies. In the preferred embodiment of the post-processor, this offset and gain adjustment calculation is done on every incoming image pixel as it is received using separate offsets and gain adjustment factors for each image pixel. However, any of a variety of other types of adjustments could be employed.

In the preferred embodiment, the digital offset and gain adjustment hardware 33 includes high-speed storage (memory) for two complete frames of 8-bit adjustment data: one for offset values and one for gain values. As each pixel arrives from the CCD, the offset and gain values for that position in the image are automatically subtracted and multiplied, respectively. With the gain and offset data pre-calculated to compensate for any optical system and camera peculiarities, the result is an adjusted data stream representing the cleanest possible output of the correlation plane image.

There are also provisions for programmable selection of the data source routed to the capture buffers 38 for subsequent display. This mechanism provides a way to selectively examine the offset and gain adjustment process at each step, for system/camera characterization, and for fault isolation. The offset and gain adjust functions 33 are also implemented in FPGA logic, which allows complete freedom for design enhancement.

The calibrated data is then simultaneously written into the input buffers 37 and capture buffers 38, where it is stored with the same organization it had in the camera. Each input buffer 37 is used for re-mapping the incoming data for use by the peak finders 35, while the capture buffer 38 is used for temporarily storing the detector image for subsequent readout by the host computer system for display or other analysis or debug purposes.

The readout of the input buffers 37 is organized so that the data fed to each of the peak finders 35 comes from a horizontal strip across the entire camera image instead of a single quadrant. This is done to reduce complexity in the peak finders' handling of the quadrant border areas, and to make the peak finders' data stream independent of the organization of the specific camera. The tap multiplex and select logic 34 generates input buffer addresses for their readout and performs the necessary intermixing and rerouting of the data.

Both the input buffers 37 and capture buffers 38 are sized to hold two complete incoming images organized in two banks. This allows pipelining such that while an incoming image is being written into one half of the buffers, a previous image can be read out of the other half and sent on its way to the subsequent post-processing functions. Readout of image data from the input buffers 37 requires that data be switched between taps, so that the data fed to each of the peak finders 35 comes from a horizontal strip across the image. All four quadrants of the input buffers 37 are read simultaneously, and the data streams are multiplexed. The progression of addresses for readout of the input buffers 37 is performed in synchronized fashion such that seamless data streams are delivered to all four peak finders 35. Each peak finder 35 is delivered a section of the input image that is a raster-scanned horizontal band containing, in this case, one quarter of the image plus three pixel rows from the next band. This is done to support the peak finders requirement for additional image pixel values for neighboring pixels to complete processing of the last row of pixels for each band of the image. This overlap or duplicate readout of some areas of the stored image to more than one peak finder 35 requires that readout of the input buffer 37 be done at a rate that is faster than the incoming pixel rate in order to maintain continuous system throughput. In a prototype of the present invention, this readout is performed at 32 million pixels per second. All this re-mapping and multiplexing control logic 34 is again implemented using FPGA logic to maximize the ready adaptability to other camera systems. Here again, the number and configuration of the input buffers 37 is somewhat arbitrary, in that the correlation image can be divided into any number of regions depending on the CCD detector configuration and the desired number of peak finders 35.

Figure 2:
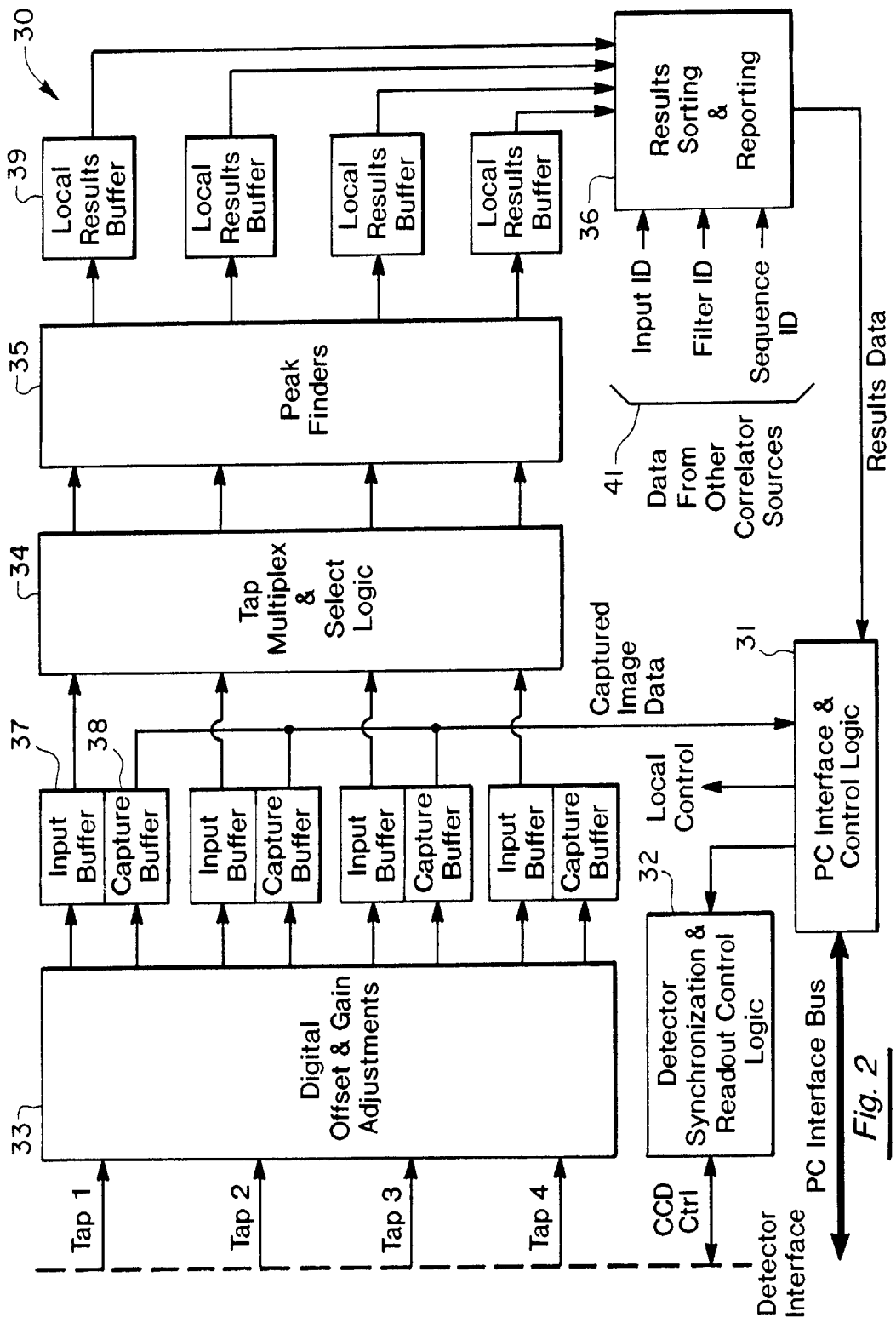
FIG. 2 is a schematic block diagram of the post-processor system.

Image data from the input buffers 37 is passed to an array of peak finders 35, as shown in FIG. 2. The peak finders 35 independently search their respective data streams for correlation peaks in a predetermined region of the input image. When a peak finder 35 finds a correlation peak, it generates a report and puts it in its local results buffer 39. Each peak finder 35 consists of a convolver array and a local maximum detector. The convolver array is a two-dimensional array of 8-bit pixel registers, configured to provide a rounded 7×7 segment or kernel of the image. Since this extends over 7 lines, row buffers hold the rest of the lines as pixels are sequentially shifted through the process. The three farthest pixels of each corner of the 7×7 are not implemented, resulting in an octagonal-shaped, 37-pixel kernel. This data is presented to the inputs of 37 multipliers. Each multiplier has two inputs, one of which receives the incoming pixel value, and the other receives a programmed coefficient. The products of these multipliers are summed to a grand total called the convolver output.

The convolver output is continuously compared to a programmable threshold value. The center pixel value of the image kernel is simultaneously compared to each of its eight nearest neighboring pixels to determine if that pixel is a local maximum within the image. When both comparisons simultaneously yield the logical true state, a correlation peak report is generated for that pixel location. The Cartesian coordinates of the peak within the image, and the value of the convolver output (as a "figure of merit") are collected and queued up in a local results buffer for that peak finder, each of which can hold up to seven correlation peak reports at a time. The octagonal 7×7 convolver is implemented using commercially available two-dimensional convolver integrated circuits. The local maximum detector and local results buffers are implemented with FPGA logic.

It should be understood that the number of peak finders 35 and the arrangement of their respective regions in the correlator image are somewhat arbitrary. A larger array of peak finders will generally result in faster processing speeds. However, this may be offset by greater hardware costs and the complexity of routing pixel data from the input buffers to the appropriate peak finders 35. In addition, other means for peak detection could be used in place of convolver arrays. Other shapes and sizes of kernels could also be substituted for peak detection.

Figure 5:
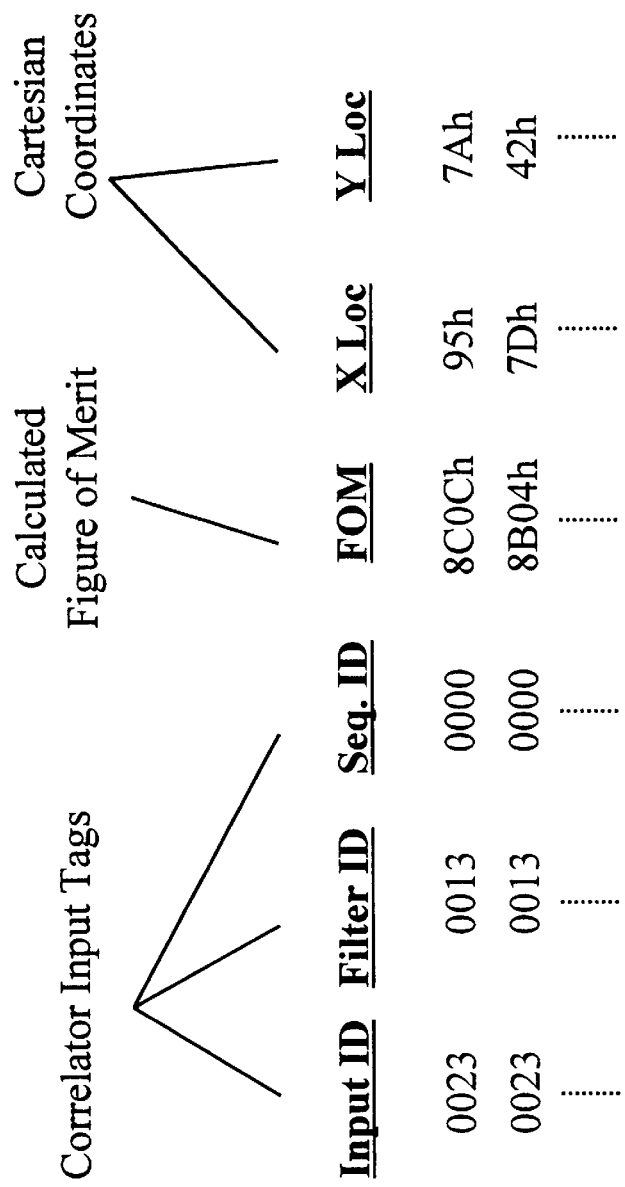
FIG. 5 is a table showing an example of a report identifying the peaks and their locations in a correlator image.

The results sorting and reporting means 36 (sorter) automatically collects the correlation peak report entries from the individual peak finders 35 as they are generated and accumulates a list of them in a small RAM array (the results collection buffer). The report entries at this point contains data on the Cartesian coordinates and merit of the peak. The sorter 36 attaches tags from external sources 41 to each report entry as it is collected, including the source identifiers from the input ID register, filter ID register, and sequence ID register indicating the input image, filter image, and filter sequence that was responsible for their creation within the optical correlator. This list is sorted by the figure of merit as each new correlation report is collected from the peak finders 35. When the list gets full, the sorter 36 begins to screen out report entries from peak finders 35 that are no better than those already in the list. When the selected reporting interval is concluded, the sorter 36 then transfers its sorted list of report entries to a FIFO buffer in one of several formats. The correlator's host processor 31 can then read the final results reports from the FIFO buffer. FIG. 5 is a table showing an example of a report identifying the peaks and their locations in a correlator image.

The threshold used by the peak finders 35 is initially determined, as a programmable value by the host computer. However, when the list becomes full, higher thresholds can automatically be sent to the peak finders 35 from the sorter 36. This allows the peak finders 35 to do more of the correlation peak screening locally, resulting in a very robust system that is able to pick out the best (e.g., up to 16) correlation peaks out of a field of potentially hundreds in each optical correlator output image.

Algorithm. A correlation peak in the optical correlator's detector output image is a bright spot of some magnitude and breadth (e.g., the black spots in FIG. 4). The exact magnitude and shape of the correlation peak is a function of many variables of the optical correlator system, including SLM efficiency, filter image efficiencies, input image quality, preprocessing algorithms used, and other optical noise resulting from component anomalies and scattered reflections. This post-processing algorithm has been developed and proven to perform exceptionally well in distinguishing real correlation peaks from other system noise being output from an optical correlator.

The use of a rounded 7×7 convolution kernel with programmable coefficients allows the exact correlation peak shape to be matched to the performance of a specific optical correlator system. The simultaneous local maximum processing on the output image, combined with the convolution processing is key in filtering out other system anomalies such as the presence of small correlation peak side lobes. The resulting output of this algorithm accurately coincides with only correlation peaks resulting from real detected image features, much more consistently than any other algorithms tested. In addition, the extensive use of FPGA logic to implement the algorithm, combined with extensive use of programmable parameter values, makes this invention an extremely robust solution to the post-processing needs of any optical correlator system.

The above disclosure sets forth a number of embodiments of the present invention. Other arrangements or embodiments, not precisely set forth, could be practiced under the teachings of the present invention and as set forth in the following claims.

We claim:

1. A post-processing system for use in association with an optical correlator having a camera for generating a correlation image as an array of pixels, said post-processor system comprising:

input means for receiving image pixels from the optical correlator camera;

peak finder means for searching the image pixels for correlation peaks exceeding a predetermined threshold figure of merit, and for generating a report entry for each such correlation peak containing the figure of merit and the location of the correlation peak within the image; and results sorting and reporting means for storing said report entries, ordering said report entries by merit, and reporting said report entries.

2. The post-processing system of claim 1 further comprising offset and gain adjustment means for compensating said image pixels for anomalies.

3. The post-processing system of claim 2 wherein offset and gain adjustment means applies separate offsets and gain adjustment factors to each of said image pixels.

4. The post-processing system of claim 1 wherein said results sorting and reporting means stores a predetermined maximum number of report entries; and after said maximum number of report entries has been reached, said results sorting and reporting means retains only those report entries having the greatest merit.

5. The post-processing system of claim 4 wherein said results sorting and reporting means adjustably controls said threshold figure of merit for said peak finder means after said maximum number of report entries has been reached to require that a subsequent report entry is generated only if a correlation peak has a figure of merit greater than the lowest figure of merit for the existing report entries.

6. The post-processing system of claim 1 wherein said input means comprises an array of input buffers, with each input buffer receiving pixels from a predetermined region of the image from the camera.

7. The post-processing system of claim 6 wherein said peak finder means comprises an array of peak finders, with each searching for correlation peaks in one of said regions of the image.

8. The post-processing system of claim 1 wherein said peak finder means comprises a convolver array and a local maximum detector.

9. The post-processing system of claim 8 wherein said convolver calculates said figure of merit for each pixel by:

(a) multiplying the values for said pixel and a predetermined set of neighboring pixels by predetermined coefficients; and (b) summing the products from step (a) to calculate a total for the figure of merit.

10. The post-processing system of claim 1 wherein the optical correlator also outputs identification data for each image, and wherein said results sorting and reporting means includes said identification data in said report entries.

11. A post-processing system for use in association with an optical correlator having a camera for generating a correlation image as an array of pixels, said post-processor system comprising:

an array of input buffers, with each input buffer receiving pixels from a predetermined region of the image from the correlator camera;

an array of peak finders, with each peak finder searching the image pixels in one of said regions of the image for correlation peaks exceeding a predetermined threshold figure of merit, and generating a report entry for each such correlation peak containing the figure of merit and the location of the correlation peak within the image; and results sorting and reporting means for storing said report entries, ordering said report entries by merit, and reporting said report entries.

12. The post-processing system of claim 11 further comprising offset and gain adjustment means for compensating said image pixels for anomalies.

13. The post-processing system of claim 12 wherein offset and gain adjustment means applies separate offsets and gain adjustment factors to each of said image pixels.

14. The post-processing system of claim 11 wherein said results sorting and reporting means stores a predetermined maximum number of report entries; and after said maximum number of report entries has been reached, said results sorting and reporting means retains only those report entries having the greatest merit.

15. The post-processing system of claim 14 wherein said results sorting and reporting means adjustably controls said threshold figure of merit for said peak finder after said maximum number of report entries has been reached to require that a subsequent report entry is generated only if a correlation peak has a figure of merit greater than the lowest figure of merit for the existing report entries.

16. The post-processing system of claim 11 wherein said peak finder comprises a convolver array and a local maximum detector.

17. The post-processing system of claim 16 wherein said convolver calculates said figure of merit for each pixel by:

(a) multiplying the values for said pixel and a predetermined set of neighboring pixels by predetermined coefficients; and (b) summing the products from step (a) to calculate a total for the figure of merit.

18. A post-processing system for use in association with an optical correlator having a camera for generating a correlation image as an array of pixels, said post-processor system comprising:

an array of input buffers, with each input buffer receiving pixels from a predetermined region of the image from the correlator camera;

an array of peak finders with each peak finder searching the image pixels in one of said regions of the image for correlation peaks exceeding a predetermined threshold figure of merit, and wherein each peak finder includes:

(a) an array of convolvers calculating said figure of merit for each pixel by:
  (i) multiplying the values for said pixel and a predetermined set of neighboring pixels by predetermined coefficients; and
  (ii) summing the products from step (i) to calculate a total for the figure of merit;
(b) a local maximum detector for detecting correlation peaks having a figure of merit exceeding said predetermined threshold; and
(c) means for generating a report entry for each such correlation peak containing the figure of merit and the location of the correlation peak within the image; and results sorting and reporting means for storing said report entries, ordering said report entries by said figures of merit, and reporting said report entries.

19. The post-processing system of claim 18 further comprising offset and gain adjustment means for compensating said image pixels for anomalies.

20. The post-processing system of claim 18 wherein said results sorting and reporting means adjustably controls said threshold figure of merit for said peak finder after said maximum number of report entries has been reached to require that a subsequent report entry is generated only if a correlation peak has a figure of merit greater than the lowest figure of merit for the existing report entries.

* * * * *